US010783440B2

(12) United States Patent
Doh et al.

(10) Patent No.: US 10,783,440 B2
(45) Date of Patent: Sep. 22, 2020

(54) METHOD AND SYSTEM FOR GENERATING A KNOWLEDGE LIBRARY AFTER ANALYSIS OF A USER DATA REQUEST

(71) Applicant: ELECTRONICS AND TELECOMMUNICATIONS RESEARCH INSTITUTE, Daejeon (KR)

(72) Inventors: Yoon Mee Doh, Daejeon (KR); Jae Hak Yu, Daejeon (KR); Kye Seon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 749 days.

(21) Appl. No.: 15/592,342

(22) Filed: May 11, 2017

(65) Prior Publication Data

US 2017/0330086 A1 Nov. 16, 2017

(30) Foreign Application Priority Data

May 12, 2016 (KR) .......................... 10-2016-0058004

(51) Int. Cl.
*G06N 5/02* (2006.01)
(52) U.S. Cl.
CPC .................... *G06N 5/022* (2013.01)
(58) Field of Classification Search
None
See application file for complete search history.

(56) References Cited

U.S. PATENT DOCUMENTS

| 8,713,076 | B2 | 4/2014 | Martin et al. | |
|---|---|---|---|---|
| 2012/0301864 | A1* | 11/2012 | Bagchi | G09B 7/02 434/362 |
| 2014/0280253 | A1* | 9/2014 | Clark | G06F 16/3344 707/755 |
| 2014/0337329 | A1* | 11/2014 | Brown | F16H 1/28 707/723 |
| 2016/0147871 | A1* | 5/2016 | Kalyanpur | G06F 16/24522 707/728 |

(Continued)

FOREIGN PATENT DOCUMENTS

| KR | 10-2015-0000418 A | 1/2015 |
|---|---|---|
| KR | 10-2015-0118046 A | 10/2015 |

*Primary Examiner* — Alan Chen
(74) *Attorney, Agent, or Firm* — LRK Patent Law Firm

(57) ABSTRACT

Methods and systems for analyzing data. The data analysis method includes generating a case data set corresponding to the data analysis request; collecting and storing raw data corresponding to the case data set; generating a knowledge package based on the raw data; generating a knowledge package library based on the knowledge package; and providing the user with the knowledge package library. Also, the case data set includes first selection parameters, and the knowledge package library includes second selection parameters different from the first selection parameters. According to the embodiments of the present disclosure, a deep understanding of business and ecosystem which is previously obtained from big data analysis and insights about data group selection, modeling, and analysis method can be provided, such that a big data analysis can be performed with enhanced efficiency.

6 Claims, 6 Drawing Sheets

(56) References Cited

U.S. PATENT DOCUMENTS

| | | | |
|---|---|---|---|
| 2016/0379120 A1* | 12/2016 | Merdivan | G06F 16/9024 |
| | | | 706/46 |
| 2017/0098163 A1* | 4/2017 | Chandrasekaran | G06N 5/04 |
| 2017/0109342 A1* | 4/2017 | Baughman | G06F 16/3329 |
| 2017/0200081 A1* | 7/2017 | Allen | G06N 20/00 |
| 2019/0266157 A1* | 8/2019 | Brown | G06F 16/334 |

* cited by examiner

METHOD AND SYSTEM FOR GENERATING A KNOWLEDGE LIBRARY AFTER ANALYSIS OF A USER DATA REQUEST

CROSS-REFERENCE TO RELATED APPLICATION(S)

This application claims priority to Korean Patent Application No. 10-2016-0058004 filed on May 12, 2016 in the Korean Intellectual Property Office (KIPO), the entire content of which is hereby incorporated by reference.

BACKGROUND

1. Field of the Invention

The present disclosure relates to methods and systems for analyzing data, and more specifically, to methods and systems for data analysis, making knowledge on the whole process of the data analysis shared and utilized in a platform, based on open source and cloud.

2. Description of Related Art

Interests in big data analysis and developments of, related technologies are exploding recently. However direct capitalization of the big data analysis is not easy because it requires hiring of professionals, collection of vast data sets, and various technologies for processing the collected data sets at high speed. In this reason, many organizations (companies, public institutions, etc.) that are interested in the big data but are not able to directly capitalize may desire to receive a service related to the big data analysis.

On the other hand, companies providing the big data analysis service may have many experts, and a variety of technologies for collecting data sets, and processing data sets as mentioned earlier. Therefore, they may be very good at providing tools needed for large-scale and a typical data processing and analysis or helping to solve primary business problems. However, it is not easy even for them to answer industry-specific questions involving complex and intensive analysis of causal relationships, since a deeper understanding of the business and ecosystem and insights into how to select, model and analyze data sets are required to answer such the industry-specific questions.

FIG. 1 is a view for explaining a conventional data analysis system.

Referring to FIG. 1, a data analysis system 200 may comprise a platform storage unit 210, and the platform storage unit 210 may store a plurality of platforms such as a platform PF-A to a platform PF-Z.

The data analysis system 200 may collect raw data. When a user 100 transmits a data analysis request RQ to the data analysis system 200, one of the multiple platforms PF-A to PF-Z stored in the platform storage unit 210 may be selected. For convenience of explanation, it may assumed that the platform PF-A is selected. The platform PF-A may collect and analyze the raw data and provide an analysis result RS-A to the user 100. However, since it provides only the analysis result of the platform PF-A, results cannot be obtained from platforms from other platforms related to similar business areas, similar locations, and similar analysis methods.

SUMMARY

Accordingly, exemplary embodiments of the present disclosure are provided to substantially obviate one or more problems due to limitations and disadvantages of the related art.

Exemplary embodiments of the present disclosure provide data analysis method and system that provide, in a form of knowledge package library, a deep understanding of business and ecosystem which is previously obtained from big data analysis and insights about data group selection, modeling, and analysis method.

Exemplary embodiments of the present disclosure also provide data analysis method and system that enable the user to easily access a data analysis and obtain results of the data analysis by providing the user with a similar knowledge package from previously-stored knowledge packages as well as a knowledge package including analyzed data.

Technical objects of the present disclosure are not limited to the aforementioned technical objects and other technical objects which are not mentioned will be apparently appreciated by those skilled in the art from the following description.

In order to achieve the above-described objective, an aspect of the present disclosure provides a method for analyzing data. The data analysis method may comprise receiving a data analysis request from a user; generating a case data set corresponding to the data analysis request; collecting and storing raw data corresponding to the case data set; generating a knowledge package based on the raw data; generating a knowledge package library based on the knowledge package; and providing the user with the knowledge package library, wherein the case data set includes first selection parameters, and the knowledge package library includes second selection parameters different from the first selection parameters.

The generating a knowledge package library may comprise measuring satisfaction levels of previously-stored knowledge packages based on the case data set; selecting knowledge packages whose satisfaction level is equal to or greater than a predetermined value from the previously-stored knowledge packages; and generating the knowledge package library by combining the selected knowledge packages with the knowledge package generated based on the raw data.

In the measuring satisfaction levels, parameters of each of the previously stored knowledge packages, including business area, location, analysis, time, and data type, may be compared with the first selection parameters.

The measuring satisfaction levels may comprise comparing the previously-stored knowledge packages with the first selection parameters to compute comparison values; and normalizing the comparison values.

In the providing the user with the knowledge package library, the knowledge package library may be provided to the user as visualized.

In order to achieve the above-described objective, another aspect of the present disclosure provides a data analysis system comprising a data analysis platform for generating a case data set corresponding to a data analysis request from a user, and generating a knowledge package based raw data; a raw data storage unit for collecting the raw data based on the case data set, and storing the raw data; and a knowledge package library generation unit for generating a knowledge package library by combining the generated knowledge package with at least one of previously-stored knowledge packages, and providing the knowledge package library to the user. Also, the case data set may include first selection parameters, and the knowledge package library may include second selection parameters different from the first selection parameters.

The knowledge package library generation unit may comprise a knowledge package storage unit for storing the previously-stored knowledge packages and the generated knowledge package; a knowledge package selection unit that selects knowledge packages having a satisfaction level with the case data set which is not less than a predetermined level as additional knowledge packages among the previously-stored knowledge packages; and a knowledge package combination unit for combining the generated knowledge package and the additional knowledge packages.

The knowledge package selection unit may compare parameters of each of the previously-stored knowledge packages, including business area, location, analysis, time, and data type, with the first selection parameters, measure satisfaction levels of the previously-stored knowledge packages based on results of the comparison, and select knowledge packages whose satisfaction level is equal to or greater than the predetermined level from the previously-stored knowledge packages.

The business area may include at least one of 'type' and 'detailed business area', the location may include at least one of 'continent', 'country', 'state', and 'city', the analysis may include at least one of 'type' and 'analysis method', the time may include at least one of 'year', 'quarter', 'month', 'day', and 'hour', and the data type may include at least one of 'data structure' and 'detailed data type'.

Each knowledge package may include at least one of a method for generating selected data by selecting the raw data, a method for extracting associations in the selected data, a method for modeling the selected data, a model generated by the modeling, a code used in the method for generating selected data, the method for extracting associations, and the method for modeling, and a number of times that the each knowledge package is used.

According to the embodiments of the present disclosure, a data analysis method and a system for providing, in a form of knowledge package library, a deep understanding of business and ecosystem which is previously obtained from big data analysis and insights about data group selection, modeling, and analysis method.

In addition, according to the embodiments of the present disclosure, similar knowledge packages among previously-stored knowledge packages as well as a knowledge package including analyzed data are provided to user, so that the user can easily access the data analysis and obtain results of the data analysis.

BRIEF DESCRIPTION OF DRAWINGS

Exemplary embodiments of the present disclosure will become more apparent by describing in detail exemplary embodiments of the present disclosure with reference to the accompanying drawings, in which.

DESCRIPTION OF EXEMPLARY EMBODIMENTS

Figure 1:
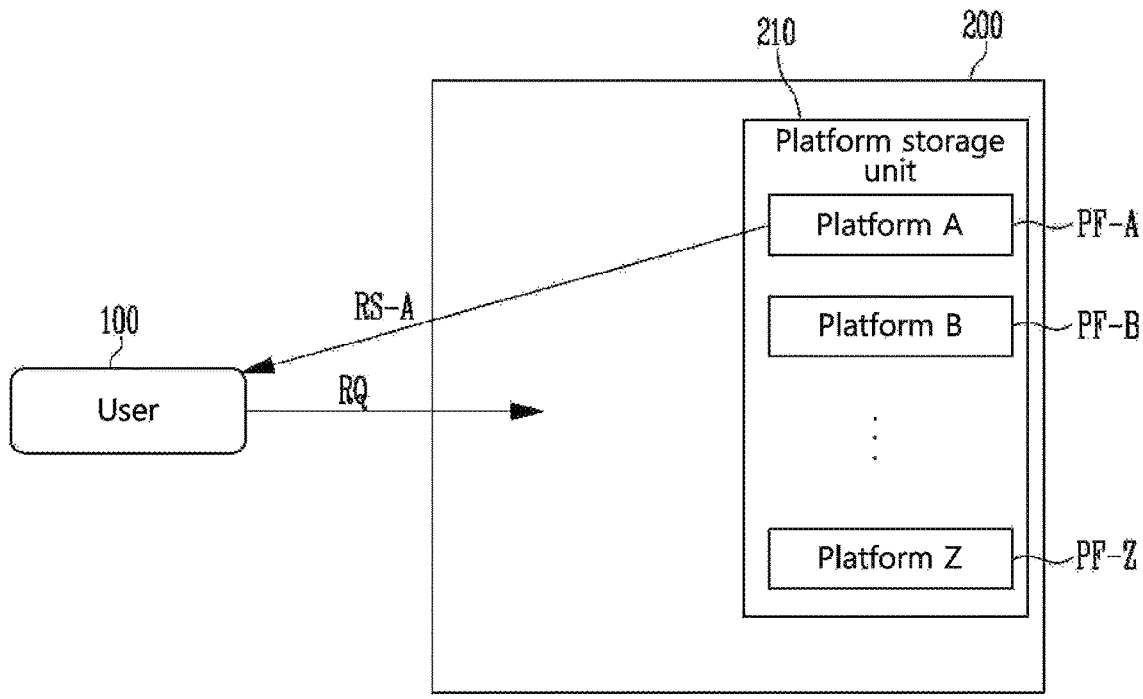
FIG. 1 is a view for explaining a conventional data analysis system.

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Combinations of respective blocks in an accompanying block diagram and respective operations in a flowchart may be performed by computer program instructions. These computer program instructions can be mounted on a processor of a general purpose computer, a special purpose computer, or other programmable data processing equipment, and thus the instructions performed by the processor of the computer or other programmable data processing equipment generate a means for performing functions described in the respective blocks of the block diagram or the respective operations of the flowchart. To implement functions in a specific way, these computer program instructions can be stored in a computer-usable or computer-readable memory capable of aiming for a computer or other programmable data processing equipment, so that the instructions stored in the computer-usable or computer-readable memory can also produce a manufactured item including an instruction means for performing functions described in the respective blocks of the block diagram or the respective operations of the flowchart.

In addition, each block or operation may indicate a part of a module, a segment or a code including one or more executable instructions for executing specific logical function(s). It should be noted that mentioned functions described in blocks or operations can be executed out of order in some alternative embodiments. For example, two consecutively shown blocks or operations can be performed substantially at the same time, or can be performed in a reverse order according to the corresponding functions.

Hereinafter, exemplary embodiments according to the present disclosure will be described in detail by referring to accompanying drawings. However, the exemplary embodiments according to the present disclosure may be changed into various forms, and thus the scope of the present disclosure is not limited to the exemplary embodiments which will be described. The exemplary embodiments are provided to assist the one of ordinary skill in the art in gaining a comprehensive understanding of the methods, apparatuses, and/or systems described herein.

Figure 2:
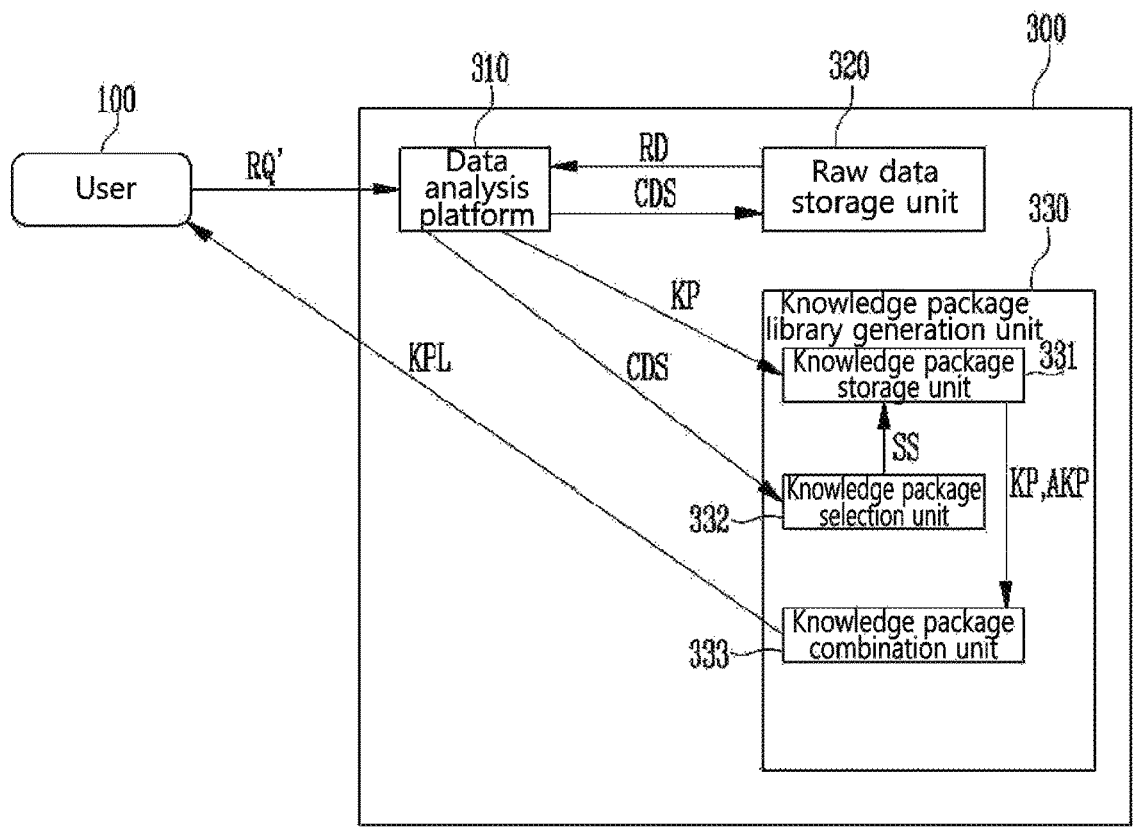
FIG. 2 is a view for explaining a data analysis system according to an embodiment of the present disclosure.

FIG. 2 is a view for explaining a data analysis system according to an embodiment of the present disclosure.

Referring to FIG. 2, a data analysis system 300 may comprise a data analysis platform 310, a raw data storage unit 320, and a knowledge package library generation unit 330.

The data analysis platform 310 may receive a data analysis request (RQ') from a user 100 and generate a case data set (CDS) in response to the data analysis request. Here, the case data set may include selection parameters and the selection parameters may include 'business area', 'location', 'analysis', 'time', and 'data type' which will be described later. For convenience of explanation, it may be assumed that the case data set includes first selection parameters requested by the user. The case data set may be transmitted to the raw data storage unit 320 and the knowledge package library generation unit 330.

Also, the data analysis platform 310 may receive raw data (RD) from the raw data storage unit 320 and then analyze the raw data to, generate a knowledge package (KP). Then, the generated knowledge package may be transmitted to the knowledge package library generation unit 330.

The raw data storage unit 320 may collect the raw data based on the case data set, and store the raw data. The raw data may be transmitted to the data analysis platform 310. As the method for collecting the raw data, a log data collection method, or the like may be used. When the raw data storage unit 320 receives a similar case data set, previously-stored rats data corresponding to the similar case, data set may also be additionally utilized.

The knowledge package library generation unit 330 may include a knowledge package storage unit 331, a knowledge package selection unit 332, and a knowledge package combination unit 333.

The knowledge package storage unit 331 may receive and store the knowledge package and transmit the knowledge package to the knowledge package combination unit 333. The knowledge package storage unit 331 may also have previously-stored knowledge packages (not shown in FIG. 2). When the knowledge package storage unit 331 receives a selection signal (SS), in response to the selection signal, at least one additional knowledge package (AKP) corresponding to the selection signal SS, among the previously-stored knowledge packages, may be transmitted to the knowledge package combination unit 333. The at least one additional knowledge package may include second selection parameters different from the first selection parameters.

The knowledge package selection unit 332 may receive the case data set, and measure satisfaction levels with each of knowledge packages stored in the knowledge package storage unit 331. Then, the knowledge package selection unit 332 may select the knowledge packages whose satisfaction level with the case data set is equal to or greater than a predetermined level, as the additional knowledge packages, and generate the selection signal corresponding to the additional knowledge packages AKP. Here, as a knowledge package satisfies more of the first selection parameters in the case set, the satisfaction level of the knowledge package may be considered to be higher. The knowledge package selection unit 332 may calculate the satisfaction level by configuring weights on the 'business area', 'location', 'analysis', 'time', and 'data type', or may determine the satisfaction level based on only a part of the 'business area', 'location', 'analysis', 'time' and 'data type'. The knowledge package selection unit 332 may include an application program (not shown) using a graphical user interface (GUI), and the application program may be used to generate the selection signal.

The knowledge package combination unit 333 may generates a knowledge package library (KPL) by combining the knowledge package provided by the data analysis platform 310 and the additional knowledge packages selected by the knowledge package selection unit 332. The knowledge package combination unit 333 may provide the knowledge package library to the user 100.

The detailed structures of the knowledge packages and the knowledge package library will be described later in detail with reference to FIG. 3 or FIG. 4.

Although the knowledge package library generation unit 330 is shown as providing only the knowledge package library, this is only an embodiment. The knowledge package library generation unit 330 may provide a knowledge package template, a knowledge package tool, or a knowledge package compatible software sample code.

The data analysis system 300 according to an embodiment of the present disclosure may provide not only the knowledge package generated based on the data analysis request but also the additional knowledge packages selected among the previously-stored KPs, which satisfy the first selection parameters by more than a predetermined amount. Therefore, the user may easily access other business areas, locations, analysis, time, and data types based on the additional knowledge packages. Since the user 100 may utilize various analysis results, it is made possible to derive the results quickly.

Figure 3:
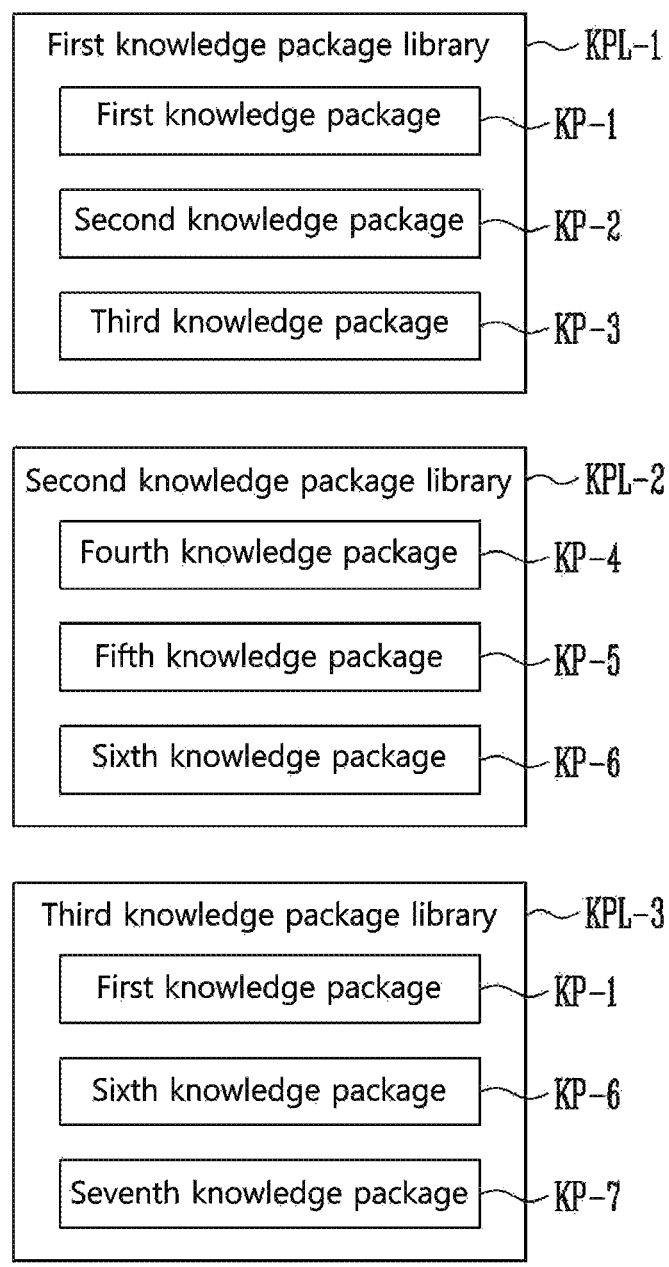
FIG. 3 is a view illustrating a knowledge package library generated by the system of FIG. 2.

FIG. 3 is a view illustrating a knowledge package library generated by the system of FIG. 2.

Each of knowledge package libraries KPL-1 to KPL-3 may correspond to the knowledge package library described above, and each of knowledge packages KP-1 to KP-7 may correspond to the knowledge package described above.

The first knowledge package library KPL-1 may be assumed to be a knowledge package library generated by processing knowledge packages whose business area is a public entity. The knowledge package selection unit 332 may select only knowledge packages whose business area is a public entity as additional knowledge packages for the first knowledge package library KPL-1. As a result, the knowledge packages KP-1, KP-2, and KP-3 may be assigned to the first knowledge package library KPL-1.

The second knowledge package library KPL-2 may be assumed to be a knowledge package library generated by processing knowledge packages whose business area is a private company. The knowledge package selection unit 332 may select only knowledge packages whose business area is a private company as additional knowledge packages for the second knowledge package library KPL-2. As a result, the knowledge packages KP-4, KP-5, And KP-6 may be assigned to the second knowledge package library KPL-2.

The third knowledge package library KPL-3 may be assumed to be a knowledge package library generated by processing knowledge packages whose location is America. The knowledge package selection unit 332 may select only knowledge packages whose location is America as additional knowledge packages for the third knowledge package library KPL-3. As a result, the knowledge packages KP-1, KP-6, and KP-7 may be assigned to the third knowledge package library KPL-3.

Since the business area of the knowledge package KP-6 is a private company and the location of it is America, it may be assigned to both of the second knowledge package library KPL-2 and the third knowledge package library KPL-3.

Figure 4:
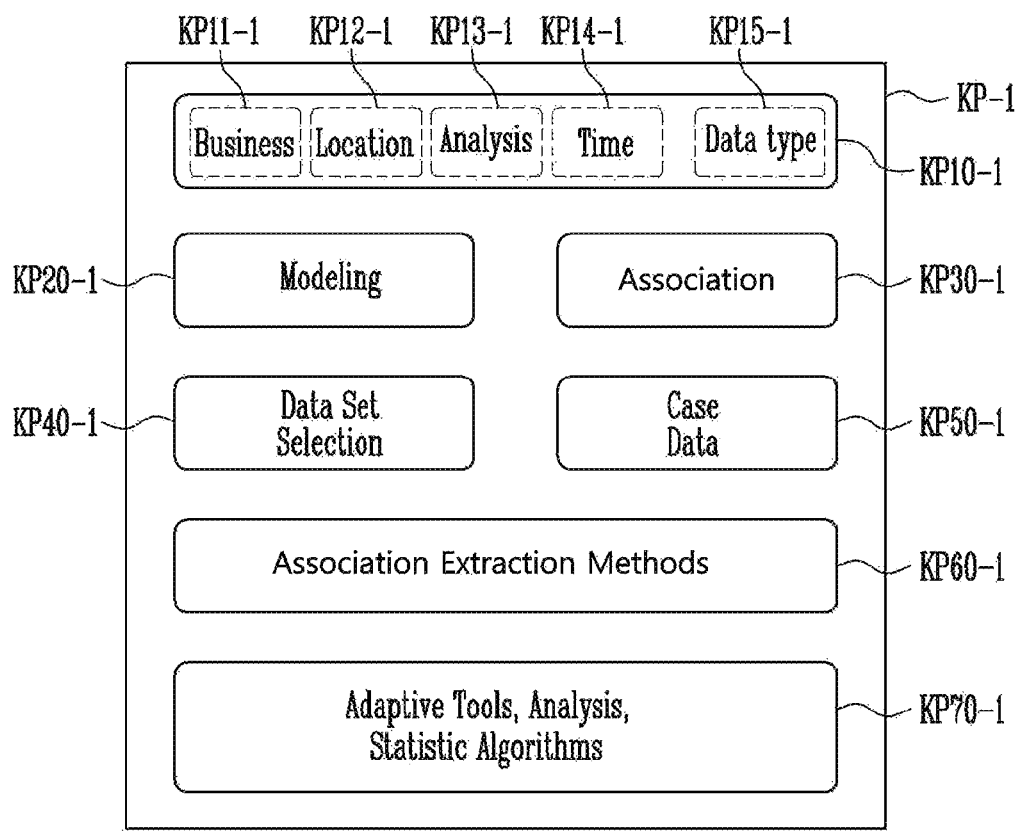
FIG. 4 is a view illustrating a knowledge package generated by the system of FIG. 2.

FIG. 4 is a view illustrating a knowledge package generated by the system of FIG. 2. For convenience of explanation, the first KP KP-1 will be exemplarily described.

The knowledge package KP-1 may include various elements such as 'selection parameters' KP10-1, 'modeling' KP20-1, 'association' KP30-1, 'data set selection' KP40-1, 'case data' KP50-1, 'association extraction method' KP60-1, and analysis related tools KP70-1. In addition to the elements described above, the knowledge package KP-1 may also include a data analysis program, a software sample code required for script, and the like.

The element 'selection parameters' KP10-1 may include parameters such as a 'business area' KP11-1, a 'location' KP12-1, an 'analysis' KP13-1, a 'time' KP14-1, and a 'data type' KP15-1. The values that the business area KP11-1, location KP12-1, analysis KP13-1, time KP14-1, or data type KP15-1 may have will be described in detail with reference to FIGS. 7 to 11.

The element 'modeling' KP20-1 may store a modeling determined by the data analysis platform 310.

The element 'association' KP30-1 may store the association extracted in the analysis of the data analysis platform 310. The element 'association extraction method' KP60-1 may store a method of extracting the association discovered through the analysis of the data analysis platform 310. The associations extracted by using the association extraction method may be stored in the element KP30-1.

The element 'data set selection' KP40-1 may store a method for the data analysis platform 310 to select some of the raw data.

In the element 'case data' KP50-1, the case data may be stored by the data analysis platform 310.

In the element 'analysis related tools' KP70-1, adaptive tools, analysis and statistical algorithms may be stored.

Figure 5:
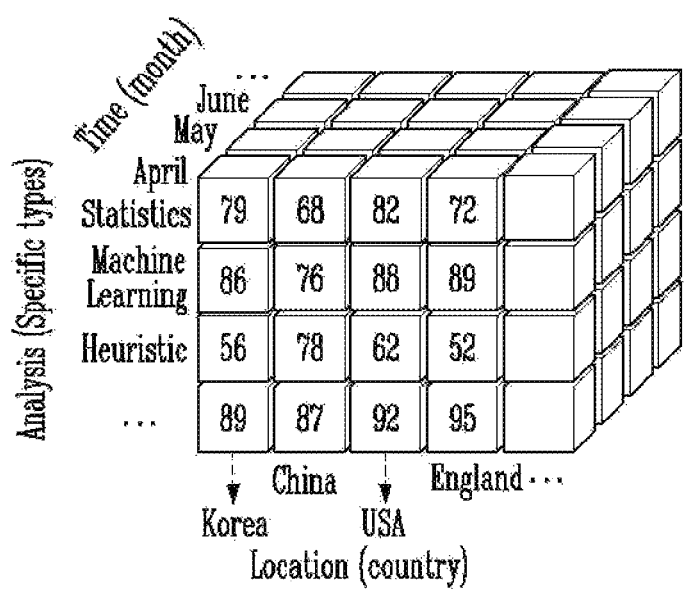
FIG. 5 is a view illustrating a data cube used by the system of FIG. 2 to select a knowledge package.

FIG. 5 is a view illustrating a data cube used by the system of FIG. 2 to select a knowledge package.

A data cube used in an embodiment of the present disclosure may include five dimension tables (business area, location, analysis, time, and data type) and one fact table. However, only three of the five dimensional tables (location, analysis and time) are illustrated in FIG. 5. The selection parameter 'business area' may have one of countries such as Korea, China, USA, and England, and the selection parameter 'analysis' may have one of statistics, machine learning, and heuristic. Also, the selection parameter 'time' may have one of April, May and June.

The fact table may contain satisfaction levels for respective cases. For example, it may be seen that the satisfaction level of the knowledge package surveyed on Korea by using statistics method in April is '79'. Also, it may be seen that the satisfaction level of the knowledge package surveyed on. USA by using machine learning method in April is '88'. Thus, the satisfaction levels may be calculated for respective knowledge packages. The satisfaction level of the knowledge package may be obtained by calculating a score according to whether the user is satisfied, and normalizing the calculated score. The dimension tables, the fact table and the satisfaction level will be described in detail later with reference to FIG. 6.

Figure 6:
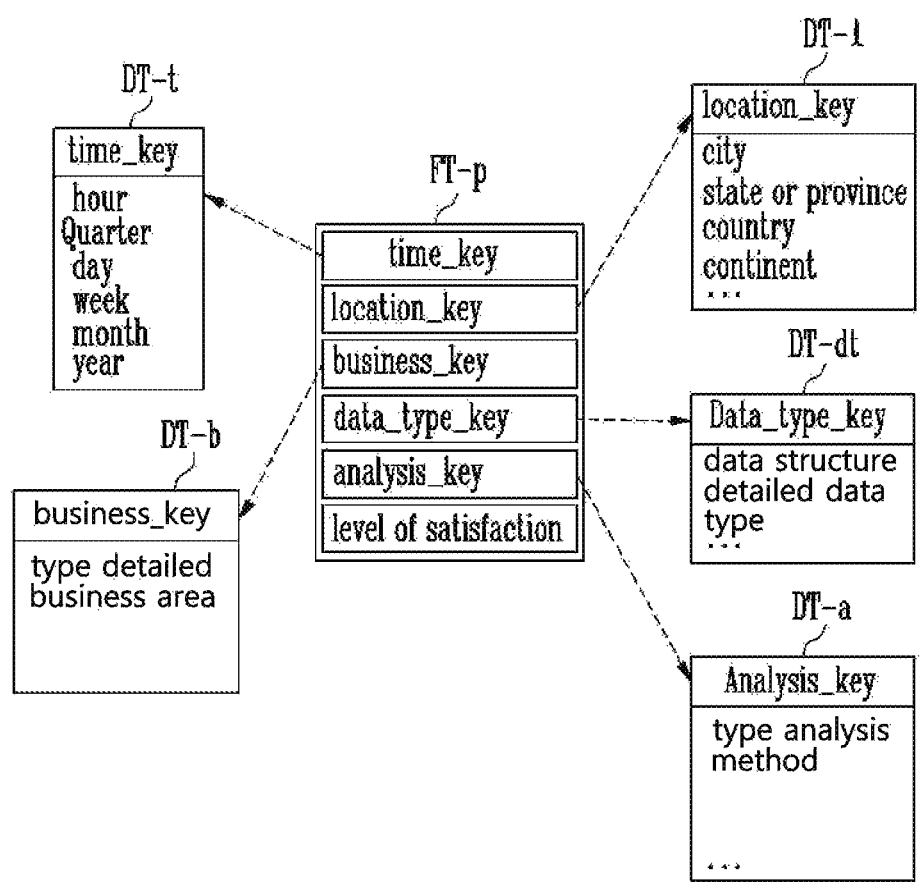
FIG. 6 is a view illustrating tables used in the data cube of FIG. 5.

FIG. 6 is a view illustrating tables used in the data cube of FIG. 5.

The tables may include five dimension tables DT-t, DT-1, DT-dt, DT-b, and DT-a, and one fact table FT-p.

The time dimension table DT-t may include items such as 'hour', 'month', 'quarter', and 'year'.

The location dimension table DT-1 may have items such as 'city', 'state or province', 'country' and 'continent'.

The business area dimension table DT-b may have items such as 'type' and 'detailed business area'.

The data type dimension table DT-dt may have items such as 'data structure' and 'detailed data type'.

The analysis dimension table DT-a may have items such as 'type' and 'detailed analysis method'.

The satisfaction level fact table FT-p may include satisfaction levels and keys (e.g., time_key, location_key, business_key, data_type_key and analysis_key) used for linking the fact table with the respective dimension tables DT-t, DT-1, DT-b, and DT-a.

The keys time_key, location_key, business_key, data_type_key, and analysis_key may be primary keys of a common database structure. The satisfaction levels may be satisfaction levels for the respective dimension tables DT-t, DT-1, DT-dt, DT-b, and DT-a. Alternatively, the satisfaction levels may be represented as a single value that summed the satisfaction levels. In this case, weights may be applied to the summation of the satisfaction levels.

In the business area dimension table DT-b, the 'type' may have a value among 'government', 'general company', and 'research institute'.

In a case that the 'type' is set to the 'government', the 'detailed business area' may have a value among 'security administration', 'national tax service', and so on.

In a case that the 'type' is set to the 'general company', the 'detailed business area' may have a value among 'services', 'medicines', and so on.

In a case that the 'type' is set to the 'research institute', the 'detailed business area' may have a value among 'research and development', and so on.

The more the details coincide, the higher the satisfaction level with the business area dimension table DT-b is. For convenience of explanation, it may be assumed that the 'type' and the 'detailed business area' of the first selection parameters requested by the user are respectively 'general company' and 'services'. In this case, a satisfaction level with a business area dimension table whose type is 'general company' and whose detailed business area is 'medicines' may be lower than that of a business area dimension table whose type is 'general company' and whose detailed business area is 'service', but higher than that of a business area dimension table whose type is 'government' and whose detailed business area is 'security administration'.

In the location dimension table DT-1, the 'continent' may have a value among 'Asia', 'Europe', 'North America', etc.

In a case that the 'continent' is set to the 'Asia', 'country' may have a value among 'Korea', 'China', etc. In a case that the 'continent' is set to the 'Europe', 'country' may have a value among 'England', 'Italia', etc. In a case that the 'continent' is set to 'North America', 'country' may have a value among 'USA', 'Canada', etc.

In a case that the 'country' is set to 'Korea', 'state or province' may have a value among 'Chung-Nam', 'Kyoung-Ki', etc.

In a case that the 'state or province' is set to 'Chung-Nam', 'city' may have a value of 'Kongju-city', etc.

The more the details coincide, the higher the satisfaction level with the location dimension table DT-1 is. Since the concept of the satisfaction level with the dimension table has already been described for the case of the business area dimension table DT-b, the details may be omitted.

In the time business table DT-t, the 'year' may have a value of indicating each year. For example, it may have a value from 1960 to 2015.

The 'quarter' may have a value of a first quarter, a second quarter, a third quarter, and a fourth quarter.

The 'month' may have a value from January to December.

The 'week' may have a value from a first week to fifty-third week.

The 'day' may have a value from Monday to Sunday.

The 'hour' may have a value from 0 and 23.

The more the details coincide, the higher the satisfaction level with the time dimension table DT-t is. For convenience of explanation, it may be assumed that the 'year' and the 'quarter' of the first selection parameters requested by the user are respectively 2010 and a first quarter. In this case, a satisfaction level with a time dimension table whose year is 2010 and whose quarter is a second quarter may be lower than that of a time dimension table whose year is 2010 and whose quarter is a first quarter, but higher than that of a time dimension table whose year is 2012 and whose quarter is a first quarter.

In the data type dimension table DT-dt, the 'data structure' may have a value among 'structured type', 'semi-structured type', 'unstructured type', etc.

In a case that the 'data structure' is set to the 'structured type', 'detailed data type' may have a value among 'relational database', 'spreadsheet', etc.

In a case that the 'data structure' is set to the 'semi-structured type', 'detailed data type' may have a value among 'extendible markup language (XML)', 'hyper-text markup language (HTML), etc.

In a case that the 'data structure' is set to the 'unstructured type', 'detailed data type' may have a value among 'image', 'audio', etc.

The more the details coincide, the higher the satisfaction level with the data type dimension table DT-dt is. Since the concept of the satisfaction level with the dimension table has already been described for the case of the business area dimension table DT-b, the details may be omitted.

In the analysis dimension table DT-a, the 'type' may have a value among 'statistics', 'machine learning', 'regression analysis', etc.

In a case that the 'type' is set to the 'statistics', 'analysis method' may have a value among 'multivariate analysis', 'spreadsheet', etc.

In a case that the 'type' is set to the 'machine learning', 'analysis method' may have a value among 'artificial neural networks', 'genetic algorithm', etc.

The more the details coincide, the higher the satisfaction level with the analysis dimension table DT-a is. Since the concept of the satisfaction level with the dimension table has already been described for the case of the business area dimension table DT-b, the details may be omitted.

Figure 7:
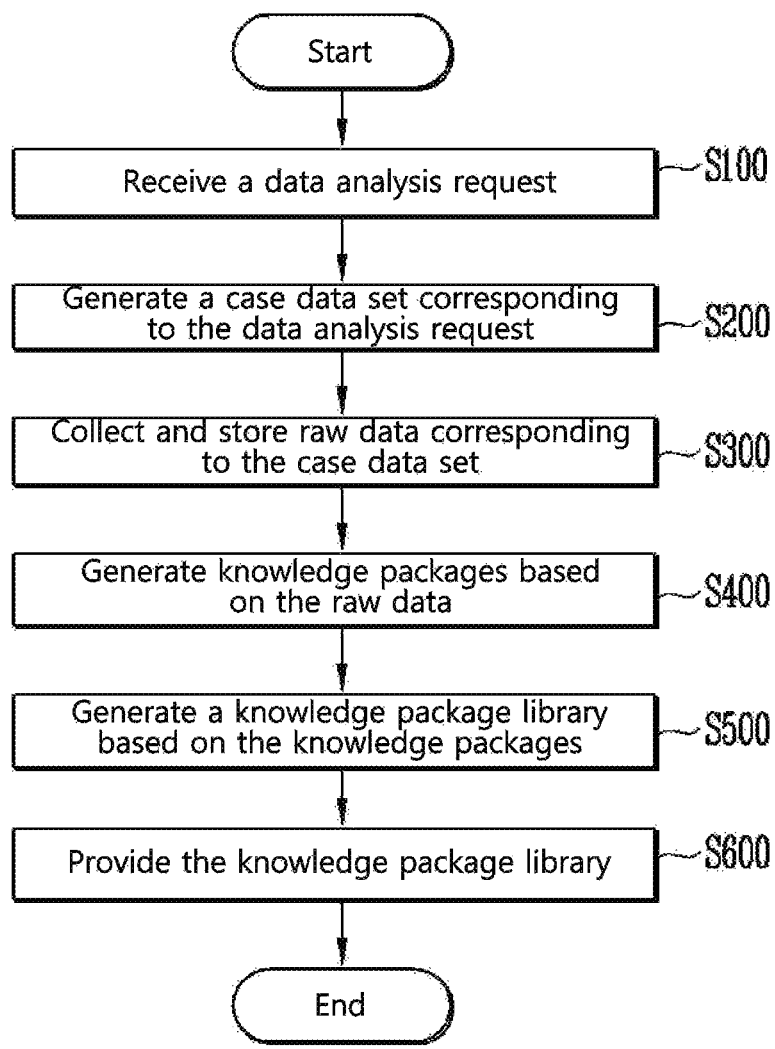
FIG. 7 is a flow chart illustrating a data analysis method according to an embodiment of the present disclosure.

FIG. 7 is a flow chart illustrating a data analysis method according to an embodiment of the present disclosure.

In a step S100, the data analysis system 300 may receive a data analysis request RQ' from the user 100.

In a step S200, the data analysis platform 310 may generate a case data set (CDS) corresponding to the data analysis request. As in the description with reference to FIG. 2, it may be assumed that the case data set includes first selection parameters.

In a step S300, the raw data storage unit 320 may receive the case data set, collect raw data corresponding to the case data set, and transmit the collected raw data RD to the data analysis platform 310. The raw data storage unit 320 may store the raw data, and the raw data may be utilized when a similar case data set is received thereafter.

In a step S400, the data analysis platform 310 may generate a knowledge package (KP) based on the raw data.

In a step S500, the knowledge package library generation unit 330 may generate a knowledge package library (KPL) based on the generated knowledge package and at least a part of the previously-stored knowledge packages. The details of the step S500 will be described in detail with reference to FIGS. 8 and 9.

In step a S600, the data analysis system 300 may provide the user 100 with the knowledge package library.

Figure 8:
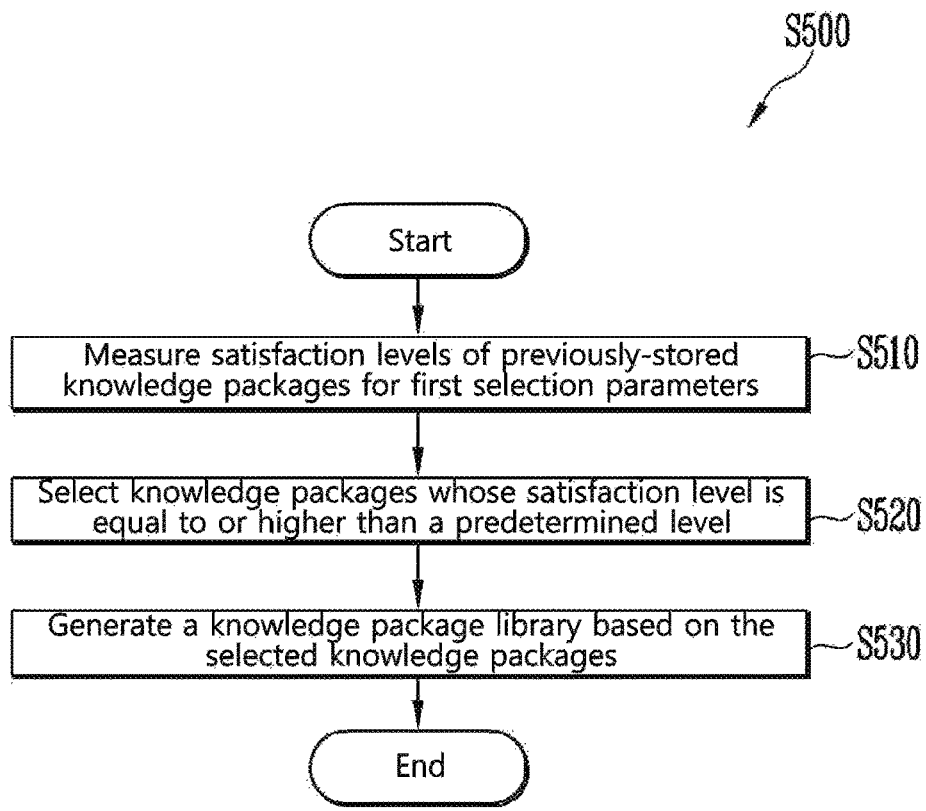
FIG. 8 is a flow chart illustrating the step S500 of FIG. 7.

FIG. 8 is a flow chart illustrating the step S500 of FIG. 7.

In a step S510, the knowledge package selection unit 332 may measure a satisfaction level based on the first selected parameters included in the case data set and the previously-stored knowledge packages. The first selection parameters may include business area, location, analysis, time, and data type. The details of the step S510 will be described later with reference to FIG. 9.

In a step S520, the knowledge package selection unit 332 may generate a selection signal for selecting knowledge packages whose satisfaction levels are equal to or greater than a predetermined value, and transmit the selection signal to the knowledge package storage unit 331. Then, to the knowledge package storage unit 331 may select additional knowledge packages (AKPs) based on the selection signal SS.

In a step S530, the knowledge package combination unit 333 may generate the knowledge package library by combining the knowledge package generated based on the raw data and the additional knowledge packages.

Figure 9:
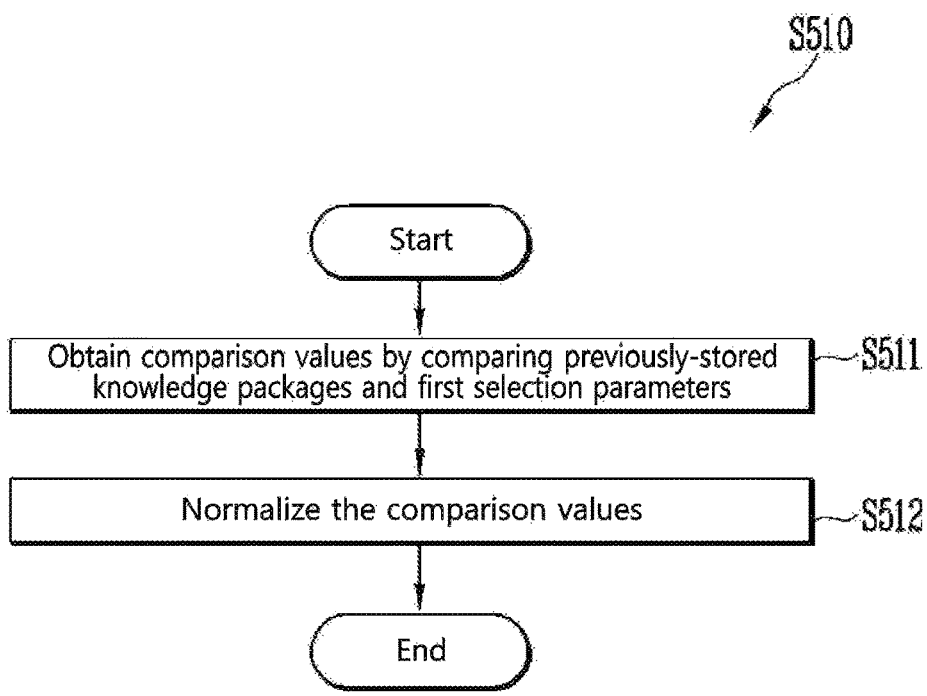
FIG. 9 is a flow chart illustrating the step S510 of FIG. 8.

FIG. 9 is a flow chart illustrating the step S510 of FIG. 8.

In a step S511, the knowledge package selection unit 332 may compare the previously-stored knowledge packages with the first selection parameters to calculate comparison values of the respective knowledge packages. The calculated comparison values may have a higher value as the detailed fields of the dimension tables DT-t, DT-1, DT-dt, DT-b, and DT-a coincide with those of the first selection parameters.

In a step S512, the comparison values may be normalized. The equation for the normalization formula may be represented as follows.

$$l \text{ of satisfaction}(v') = \frac{v - \min_A}{\max_A - \min_A}(\text{new\_max}_A - \text{new\_mix}_A) + \text{new\_min}_A. \quad \text{[Equation 1]}$$

Here, v is a satisfaction level before normalization, v' is a satisfaction level after normalization, $\max_A$ is the maximum value of satisfaction level before normalization, $\text{new\_max}_A$ is the maximum value of satisfaction level after normalization, $\min_A$ is the minimum value of satisfaction level before normalization, and $\text{new\_min}_A$ is the minimum value of satisfaction level after normalization. Based on Equation 1, v may be min-max normalized to v'.

While the embodiments of the present disclosure and their advantages have been described in detail above, it should be understood that various changes, substitutions and alterations may be made herein without departing from the scope of the disclosure.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for analyzing data, the method comprising:
receiving a data analysis request from a user;
generating a case data set corresponding to the data analysis request;
collecting and storing raw data corresponding to the case data set;
generating a knowledge package based on the raw data;
generating a knowledge package library based on the knowledge package; and
providing the user with the knowledge package library,
wherein the case data set includes first selection parameters, and the knowledge package library includes second selection parameters different from the first selection parameters,
wherein the generating a knowledge package library comprises:
measuring satisfaction levels of previously-stored knowledge packages based on the case data set;
selecting knowledge packages whose satisfaction level is equal to or greater than a predetermined value from the previously-stored knowledge packages; and
generating the knowledge package library by combining the selected knowledge packages with the knowledge package generated based on the raw data,
wherein the measuring satisfaction levels comprises:
comparing the previously-stored knowledge packages with the first selection parameters to compute comparison values; and
normalizing the comparison values by calculating a satisfaction level after normalization based on a satisfaction level before normalization, a maximum value of satisfaction level before normalization, a maximum value of satisfaction level after normalization, a minimum value of satisfaction level before normalization, and a minimum value of satisfaction level after normalization.

2. The method according to claim 1, wherein, in the measuring satisfaction levels, parameters of each of the previously stored knowledge packages, including business area, location, analysis, time, and data type, are compared with the first selection parameters.

3. The method according to claim 1, wherein, in the providing the user with the knowledge package library, the knowledge package library is provided to the user as visualized.

4. A data analysis system comprising:
a server comprising one or more units which are executable by a processor which is connected to a computer readable memory, said one or more units comprising:
a data analysis platform unit for generating a case data set corresponding to a data analysis request from a user, and generating a knowledge package based raw data;
a raw data storage unit for collecting the raw data based on the case data set, and storing the raw data; and
a knowledge package library generation unit for generating a knowledge package library by combining the generated knowledge package with at least one of previously-stored knowledge packages, and providing the knowledge package library to the user,
wherein the case data set includes first selection parameters, and the knowledge package library includes second selection parameters different from the first selection parameters,
wherein the knowledge package library generation unit comprises:
a knowledge package storage unit for storing the previously-stored knowledge packages and the generated knowledge package;
a knowledge package selection unit that selects knowledge packages having a satisfaction level with the case data set which is not less than a predetermined level as additional knowledge packages among the previously-stored knowledge packages; and
a knowledge package combination unit for combining the generated knowledge package and the additional knowledge packages,
wherein the knowledge package selection unit compares parameters of each of the previously-stored knowledge packages, including business area, location, analysis, time, and data type, with the first selection parameters, measures satisfaction levels of the previously-stored knowledge packages based on results of the comparison, and selects knowledge packages whose satisfaction level is equal to or greater than the predetermined level from the previously-stored knowledge packages,
wherein the measuring satisfaction levels comprises:
comparing the previously-stored knowledge packages with the first selection parameters to compute comparison values; and
normalizing the comparison values by calculating a satisfaction level after normalization based on a satisfaction level before normalization, a maximum value of satisfaction level before normalization, a maximum value of satisfaction level after normalization, a minimum value of satisfaction level before normalization, and a minimum value of satisfaction level after normalization.

5. The data analysis system according to claim 4, wherein the business area includes at least one of 'type' and 'detailed business area', the location includes at least one of 'continent', 'country', 'state', and 'city', the analysis includes at least one of 'type' and 'analysis method', the time includes at least one of 'year', 'quarter', 'month', 'day', and 'hour', and the data type includes at least one of 'dada data structure' and 'detailed data type'.

6. The data analysis system according to claim 4, wherein each knowledge package includes at least one of a method for generating selected data by selecting the raw data, a method for extracting associations in the selected data, a method for modeling the selected data, a model generated by the modeling, a code used in the method for generating selected data, the method for extracting associations, and the method for modeling, and a number of times that the each knowledge package is used.

* * * * *